(12) United States Patent
Crouch et al.

(10) Patent No.: US 9,841,303 B2
(45) Date of Patent: Dec. 12, 2017

(54) PLATE CARRIER GUIDE FOR AN ORIFICE FITTING

(71) Applicant: Daniel Measurement and Control, Inc., Houston, TX (US)

(72) Inventors: Justin Blake Crouch, Cypress, TX (US); Gregory Theron Jay, Cypress, TX (US)

(73) Assignee: Daniel Measurement and Control, Inc., Houston, TX (US)

( * ) Notice: Subject to any disclaimer, the term of this patent is extended or adjusted under 35 U.S.C. 154(b) by 0 days.

(21) Appl. No.: 15/098,014

(22) Filed: Apr. 13, 2016

(65) Prior Publication Data

US 2016/0305801 A1    Oct. 20, 2016

Related U.S. Application Data

(60) Provisional application No. 62/149,256, filed on Apr. 17, 2015.

(51) Int. Cl.
*G01F 1/42*    (2006.01)

(52) U.S. Cl.
CPC ..................... *G01F 1/42* (2013.01)

(58) Field of Classification Search
CPC ..... G01F 1/37; G01F 1/42; G05D 7/01; B01F 5/06
USPC ........ 73/861.61, 861.51; 138/44; 137/601.18
See application file for complete search history.

(56) References Cited

U.S. PATENT DOCUMENTS

| | | | | |
|---|---|---|---|---|
| 4,478,251 A * | 10/1984 | Sanchez | ............... | F16K 3/0227 137/625.33 |
| 5,069,252 A * | 12/1991 | Kendrick | .................. | G01F 1/42 138/40 |
| 5,085,250 A * | 2/1992 | Kendrick | ................ | G01F 15/00 138/40 |
| 5,181,542 A * | 1/1993 | Wass | ......................... | G01F 1/42 138/40 |
| 5,318,073 A * | 6/1994 | Kendrick | ............. | F15D 1/0005 138/44 |
| 6,871,666 B1 * | 3/2005 | Loga | ..................... | F16K 3/0209 137/2 |
| 7,461,563 B1 * | 12/2008 | Peng | ........................ | G01F 1/42 73/861.52 |
| 2016/0131510 A1* | 5/2016 | Knoll | ....................... | G01F 1/42 73/861.61 |

* cited by examiner

*Primary Examiner* — Jewel V Thompson
(74) *Attorney, Agent, or Firm* — Conley Rose, P.C.

(57) ABSTRACT

A device and method for positioning an orifice plate carrier in an orifice fitting. The positioning device is secured in an upper chamber of the fitting and includes an insert having a first end and a second end, and a back side, a first side, and a second side each extending from and connecting the first and second ends to form a through-passage with a front side. The through-passage is configured to allow the orifice plate carrier to pass therethrough. The first and second sides include a first cutout and a second cutout, respectively, which are configured to allow a gear to pass therethrough. The gear engages grooves on the orifice plate carrier to pass the orifice plate carrier through the upper chamber. The positioning device provides consistent and repeatable alignment in guiding the orifice plate carrier in and out of the fitting.

20 Claims, 13 Drawing Sheets

PLATE CARRIER GUIDE FOR AN ORIFICE FITTING

CROSS-REFERENCE TO RELATED APPLICATIONS

This application claims benefit of U.S. provisional patent application Ser. No. 62/149,256 filed Apr. 17, 2015, and entitled "Plate Carrier Guide for an Orifice Fitting," which is hereby incorporated herein by reference in its entirety for all purposes.

STATEMENT REGARDING FEDERALLY SPONSORED RESEARCH OR DEVELOPMENT

Not applicable.

BACKGROUND

In pipeline operations and other industrial applications, flowmeters are used to measure the volumetric flow rate of a gaseous or liquid flow stream moving through a piping section. Flowmeters can include an orifice fitting, which orients and supports an orifice plate in a plate carrier that extends across the piping section perpendicular to the direction of the flow stream. A dual chamber orifice fitting allows the plate carrier be removed from the fitting without interrupting the flow stream moving through the piping section.

BRIEF SUMMARY OF THE DISCLOSURE

In an embodiment, an apparatus for positioning an orifice plate in an orifice fitting comprises an insert having a through-passage extending from a first end to a second end, the second end having extensions configured to secure the apparatus to an internal portion of the orifice fitting. The apparatus further includes a first side having a first opening to allow access to the passage, and a second side having a second opening to allow access to the passage. In addition, the passage is configured to allow the orifice plate installed on an orifice plate carrier to pass therethrough. Further, the first and second openings are configured to allow a gear to pass therethrough, and the gear is configured to engage the orifice plate carrier.

In an embodiment, an orifice fitting having a system for positioning an orifice plate carrier in the orifice fitting comprises a body having a lower chamber and a top having an upper chamber, and an orifice plate disposed in the orifice plate carrier, the carrier having a first row of grooves disposed on a first end of the orifice plate carrier and second row of grooves disposed on a second end of the orifice plate carrier. The orifice fitting further includes a gear disposed in the upper chamber configured to engage the orifice plate carrier, and an insert disposed in the upper chamber, the insert having a cavity or through-passage, a first end with a first opening, a second end with a second opening and a plurality of protrusions, a first side, and a second side, where the through-passage extends from the first opening to the second opening. Moreover, the first side includes a first cutout and the second side includes a second cutout. Further, the through-passage is configured to allow the orifice plate carrier to pass therethrough and the first and second cutouts are configured to allow the gear to pass therethrough.

In an embodiment, a method of positioning an orifice plate carrier in an orifice fitting comprises engaging grooves on opposite ends of the orifice plate carrier with a first drive gear and a second drive gear, where the orifice plate carrier is disposed in a cavity or through-passage of an insert, the first drive gear passes through a first cutout in the insert, and the second drive gear passes through a second cutout in the insert. The method further includes actuating the first and second drive gears via an upper drive, and passing the orifice plate carrier through the insert.

Thus, embodiments described herein include a combination of features and characteristics intended to address various shortcomings associated with certain prior devices, systems, and methods. The various features and characteristics described above, as well as others, will be readily apparent to those of ordinary skill in the art upon reading the following detailed description, and by referring to the accompanying drawings.

BRIEF DESCRIPTION OF THE DRAWINGS

For a detailed description of the disclosed embodiments, reference will now be made to the accompanying drawings in which.

DETAILED DESCRIPTION OF EXEMPLARY EMBODIMENTS

The following discussion is directed to various exemplary embodiments. However, one skilled in the art will understand that the examples disclosed herein have broad application, and that the discussion of any embodiment is meant only to be exemplary of that embodiment, and not intended to suggest that the scope of the disclosure, including the claims, is limited to that embodiment.

Certain terms are used throughout the following description and in the claims to refer to particular features or components. As one skilled in the art will appreciate, different persons may refer to the same feature or component by different names. This document does not intend to distinguish between components or features that differ in name but not function. The drawing figures are not necessarily to scale. Certain features and components herein may be shown exaggerated in scale or in somewhat schematic form and some details of conventional elements may not be shown in interest of clarity and conciseness.

In the following discussion and in the claims, the terms "including" and "comprising" are used in an open-ended fashion, and thus should be interpreted to mean "including, but not limited to . . . ." Also, the term "couple" or "couples" is intended to mean either an indirect or direct connection. Thus, if a first device couples to a second device, that connection may be through a direct connection, or through an indirect connection via other devices, components, and connections. In addition, as used herein, the terms "axial" and "axially" generally mean along or parallel to a central axis (e.g., central axis of a body or a port), while the terms "radial" and "radially" generally mean perpendicular to the central axis. For instance, an axial distance refers to a distance measured along or parallel to the central axis, and a radial distance means a distance measured perpendicular to the central axis.

Figure 1:
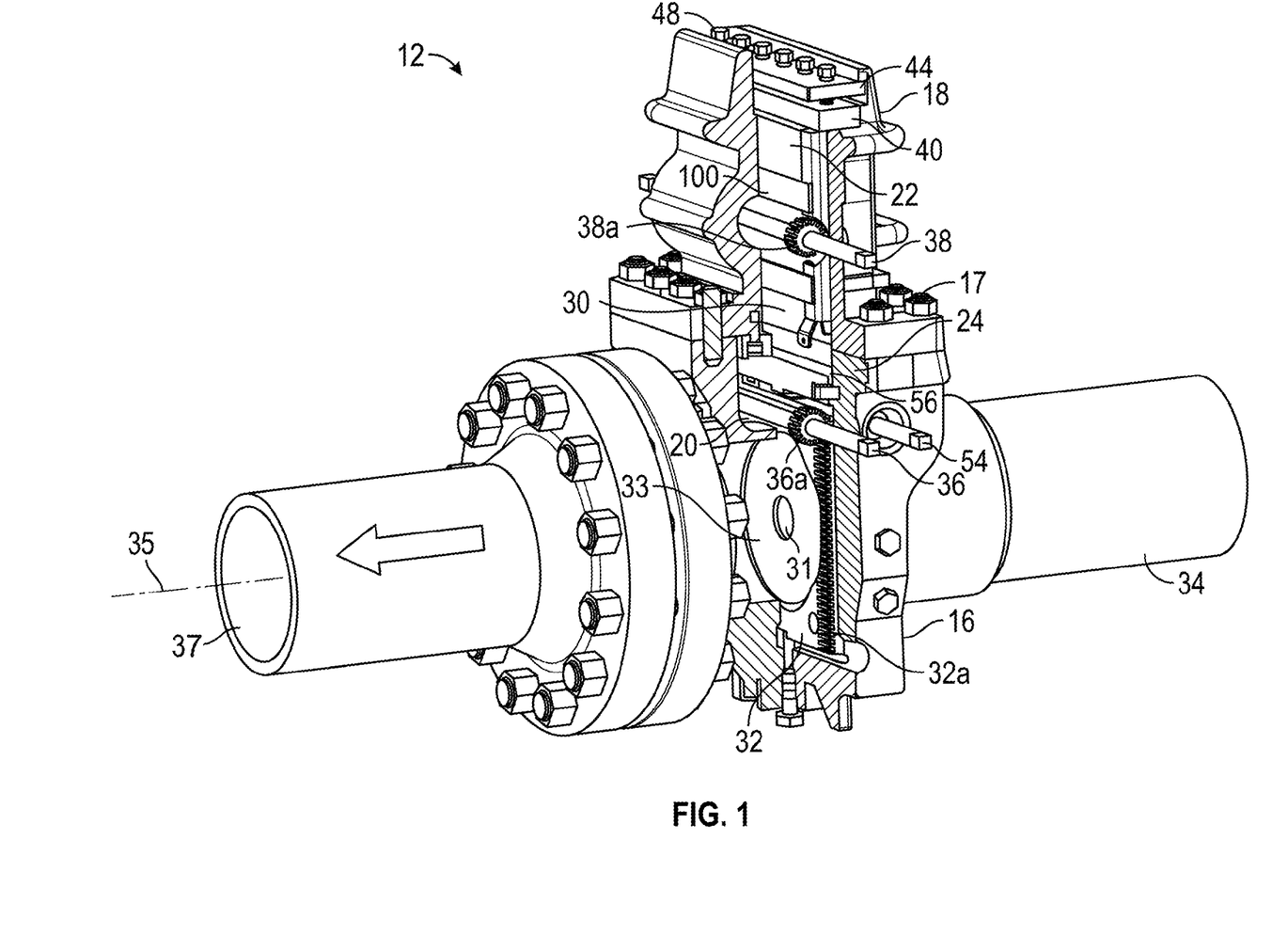
FIG. 1 is a partial sectional isometric view of a dual chamber orifice flowmeter having a positioning device in accordance with the principles described herein.

Referring now to FIG. 1, a partial sectional view of an example of an orifice flowmeter 12, more specifically a dual chamber orifice fitting, is illustrated. Orifice flowmeter 12 includes body 16 and top 18. Body 16 encloses lower chamber 20, which is in fluid communication with the interior or bore of pipeline 34, which extends along a longitudinal axis 35 on either side of flowmeter 12. A flow passage 37 extends through and includes the interior of the pipeline 34 and lower chamber 20. Top 18 encloses upper chamber 22, which houses a plate carrier guide or insert 100, and is connected to body 16 by bolts 17. Insert 100 is an example of a positioning device. Aperture 30 defines an opening connecting upper chamber 22 to lower chamber 20. Aperture 30 is configured to isolate upper chamber 22 and the insert 100 from lower chamber 20 and from flow passage when in a closed configuration, and aperture 30 is configured to allow communication among these features when in an open configuration. Valve seat 24 is connected to top 18 and provides a sealing engagement with a slide valve plate 56, which is slidably actuated by rotating gear shaft 54. Lower drive 36 and upper drive 38 operate to move orifice plate carrier 32 vertically within flowmeter 12.

Orifice 31 is located on an orifice plate 33 supported by orifice plate carrier 32. Orifice plate carrier 32 is shown in a metering position in axial alignment with the interior of pipeline 34. Flow passage 37 extends through orifice 31 when orifice plate carrier 32 and orifice plate 33 are seated in lower chamber 20. To remove orifice plate carrier 32 from flowmeter 12, the gear shaft 54 is rotated to slide valve plate 56 laterally and away from valve seat 24 and open aperture 30. Once aperture 30 is opened, lower drive 36 is actuated to move orifice plate carrier 32 upwards into upper chamber 22. Once orifice plate carrier 32 is entirely within upper chamber 22, aperture 30 is closed to isolate the upper chamber 22, insert 100, and carrier 32 from pipeline 34 and lower chamber 20; in other words, to isolate those features from flow passage 37. Any pressure within upper chamber 22 can then be relieved and orifice plate carrier 32 can be removed from flowmeter 12 by loosening clamping bar screws 48 and removing clamping bar 44 and sealing bar 40 from top 18.

Figure 2:
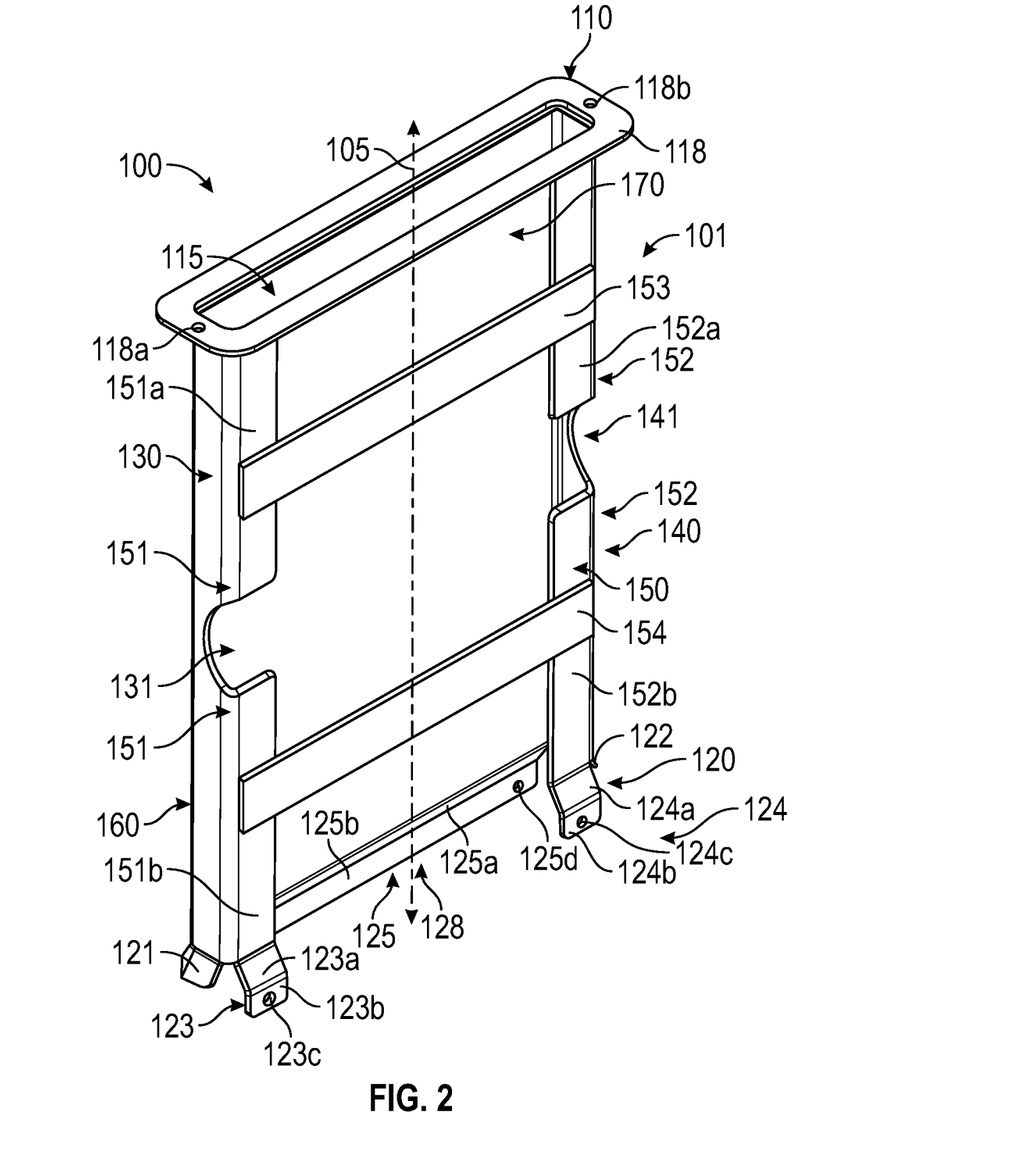
FIG. 2 shows an external perspective view of the positioning device of FIG. 1.
Figure 3:
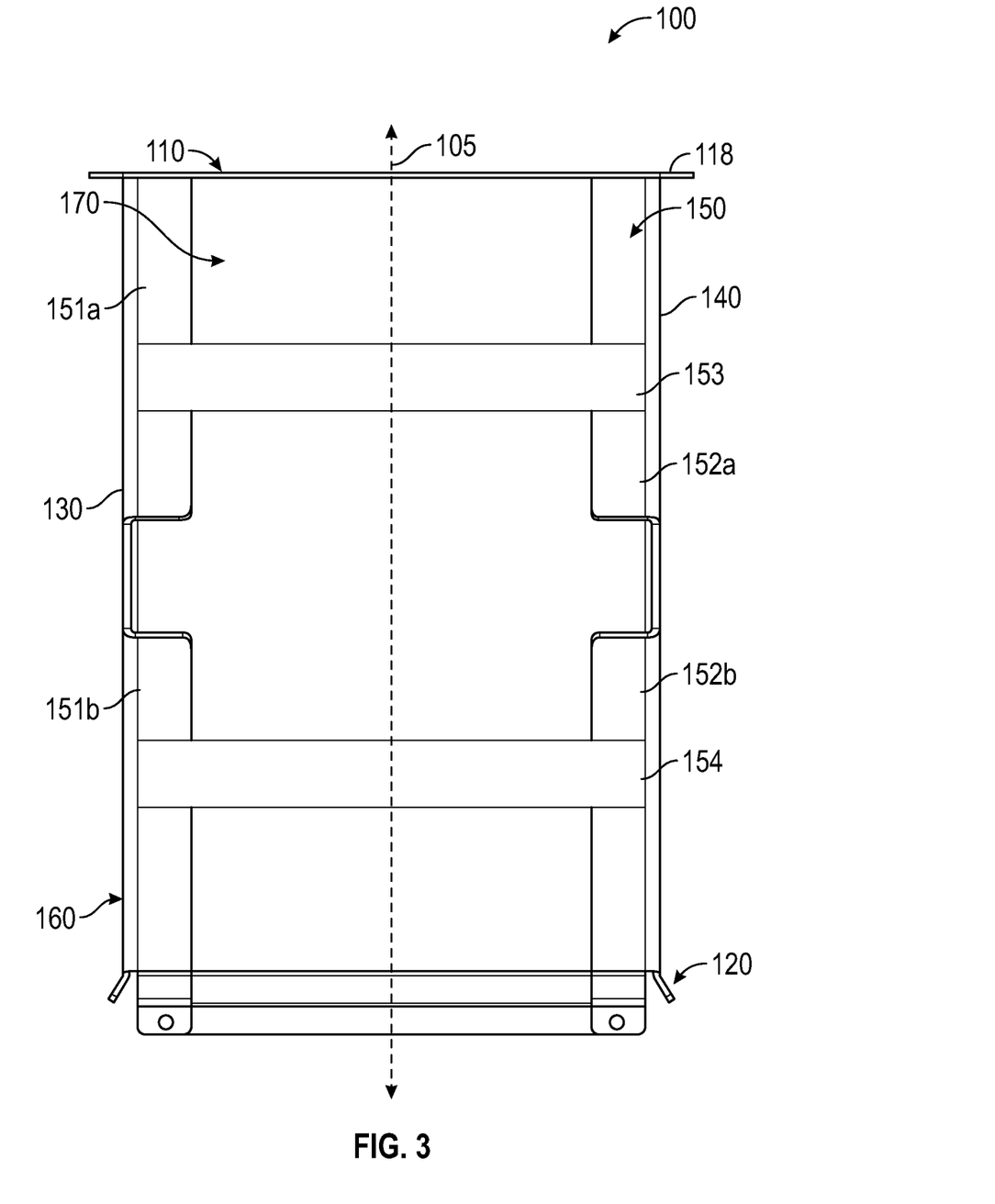
FIG. 3 is an external front view of the positioning device of FIG. 1.
Figure 4:
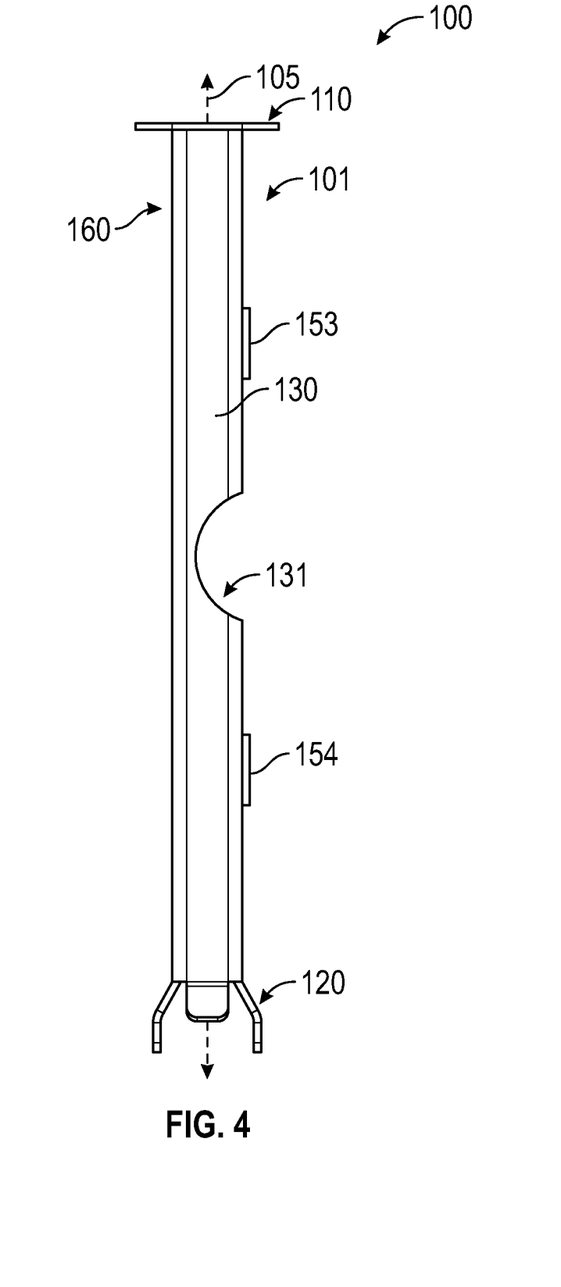
FIG. 4 is an external side view of the positioning device of FIG. 1.

Referring now to FIGS. 2-4, insert 100 includes housing 101 having a central axis 105 and a first or upper end 110, a second or lower end 120, a first side 130, a second side 140, a front side 150, and a back side 160 to form a cavity or interior through-passage 170, in accordance with the principles described herein is shown.

In the present embodiment, the upper end 110 is disposed opposite the lower end 120 and comprises an opening 115 surrounded by a lip or protrusion 118 that extends radially outward from opening 115. Lip or protrusion 118 includes two through holes 118a, 118b, the first through hole 118a is disposed proximate the first side 130 and the second through hole 118b is disposed proximate the second side 140. In other embodiments, the lip 118 may have three or more through holes, or may have no through holes. In other embodiments, the upper end may comprise a plurality of protrusions 118 (see FIGS. 10-16); in still other embodiments, the upper end may comprise a plurality of protrusions 118 with through holes 118a, 118b in the protrusions 118 disposed proximate the first side 130 and second side 140.

Referring still to FIGS. 2-4, first side 130 is generally parallel to and spaced apart from second side 140; the first side 130 and the second side 140 are generally rectangular and thus, generally perpendicular to lip 118 of upper end 110. In this embodiment, first side 130 and second side 140 include cutouts 131, 141, respectively. Cutouts 131, 141 are disposed approximately halfway between the upper end 110 and the lower end 120, and proximate the front side 150. In other embodiments, the cutouts may be located closer to the upper end 110 or closer to the lower end 120. In the present embodiment, the cutouts 131, 141 are semicircular. In other embodiments, cutouts 131, 141 may be any suitable shape.

The front side 150 is generally parallel to and spaced apart from the back side 160; the front side 150 and back side 160 are generally rectangular and thus, generally perpendicular to the lip 118 of upper end 110, and generally perpendicular to the first and second sides 130, 140, respectively. The front side 150 comprises a first elongate portion 151, a second elongate portion 152, an upper cross panel 153 and a lower cross panel 154. The first elongate portion 151 is disposed adjacent first side 130 and extends axially from upper end 110 to lower end 120. The second elongate portion 152 is disposed adjacent second side 140 and extends axially from upper end 110 to lower end 120. Cutout 131 of first side 130 extends to the first elongate portion 151, separating the first elongate portion into an upper portion 151a and a lower portion 151b; similarly, cutout 141 of second side 140 extends to the second elongate portion 152, separating the second elongate portion into an upper portion 152a and a lower portion 152b. The upper cross panel 153 extends from the upper portion 151a of the first elongate portion 151 to the upper portion 152a of the second elongate portion 152, and the lower cross panel 154 extends from the lower portion 151b of the first elongate portion 151 to the lower portion 152b of the second elongate portion 152. In alternative embodiments, the front side 150 may comprise additional panels and/or the elongate portions may be any suitable width.

The lower end 120 comprises an opening 128 and a plurality of protrusions or extensions 121-125. The cavity 170 extends from the opening 115 in the upper end 110 to the opening 128 in the lower end 120. A first protrusion 121 extends axially downward and radially outward from first side 130. A second protrusion 122 extends axially downward and radially outward from second side 140. A third protrusion 123 and a fourth protrusion 124 extend axially downward and radially outward from the front side 150, the third protrusion 123 is proximate the first side 130 and the fourth protrusion 124 is proximate the second side 140. The third and fourth protrusions 123, 124, respectively, each further comprise an angular portion 123a, 124a, respectively, that extends axially downward and radially outward from the front side 150, and a generally vertical portion 123b, 124b, respectively, that extends axially downward from the angular portion 123a, 124a. Each vertical portion 123b, 124b has a through bore 123c, 124c, respectively, disposed on the vertical portion 123b, 124b of the third and fourth protrusions, respectively. A fifth protrusion 125 extends from approximately the first side 130 to the second side 140 and comprises an angular portion 125a that extends axially downward and radially outward from the back side 160, and a generally vertical portion 125b that extends axially downward from the angular portion 125a. In the present embodiment, the vertical portion 125b has two through bores 125c, 125d disposed on the vertical portion 125b, one disposed proximate the first side 130 (125c shown in FIG. 9) and one disposed proximate the second side 140 (125d).

Figure 5:
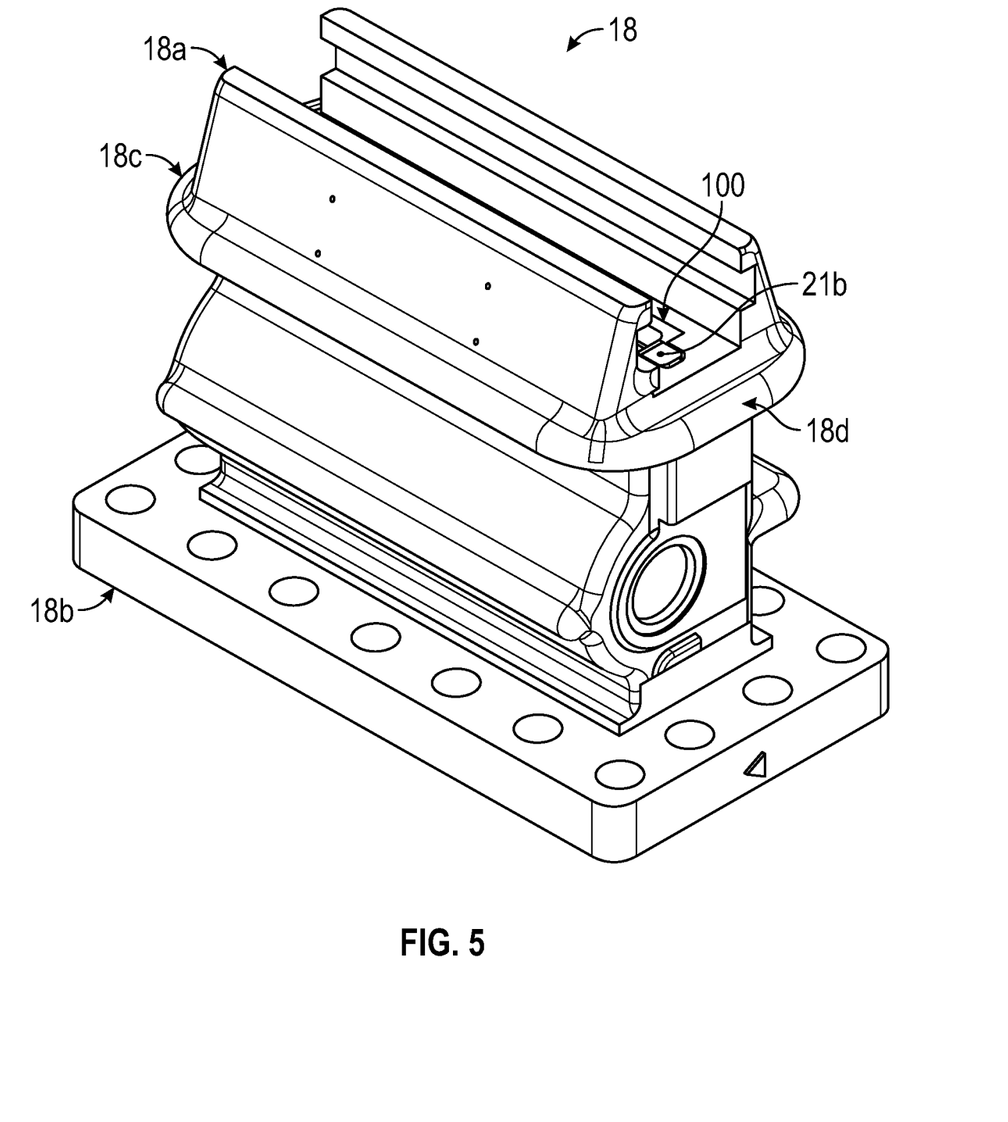
FIG. 5 is an external side view of the top of the dual chamber orifice flowmeter having a positioning device of FIG. 1.
Figure 6:
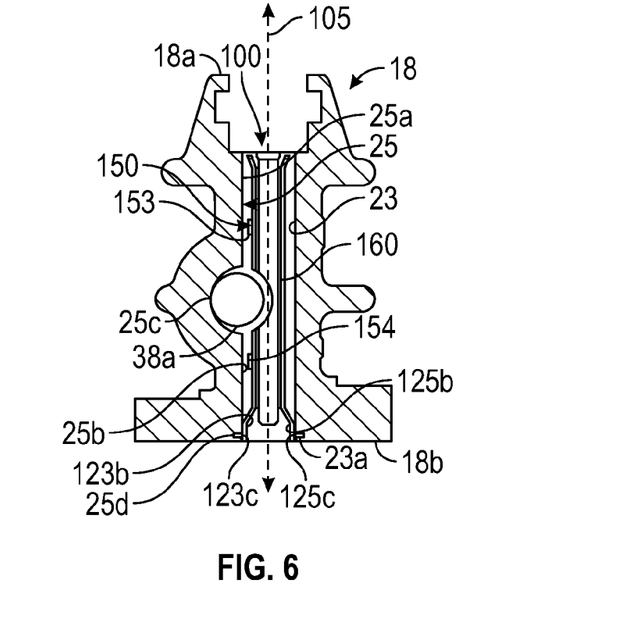
FIG. 6 shows a partial cross-sectional side view of the positioning device and the top of the flowmeter of FIG. 5.
Figure 7:
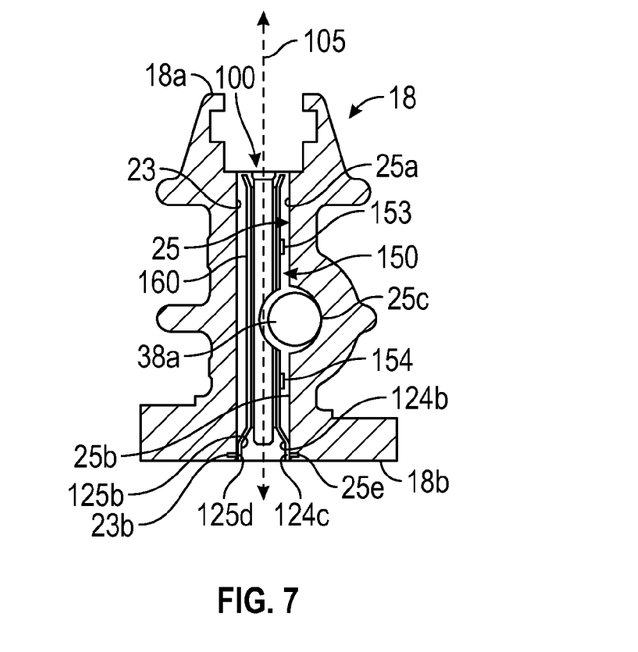
FIG. 7 shows a partial cross-sectional side view of the positioning device and the top of the flowmeter of FIG. 5.
Figure 8:
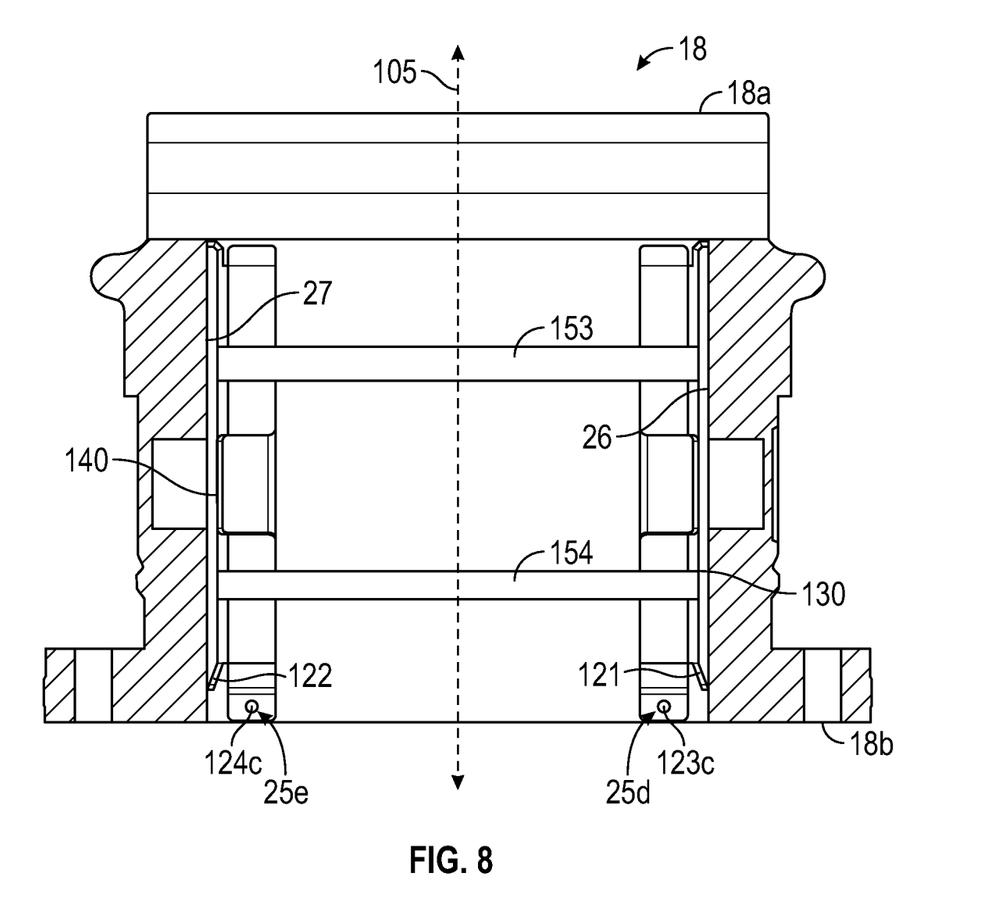
FIG. 8 shows a partial cross-sectional back view of the positioning device and the top of the flowmeter of FIG. 5.
Figure 9:
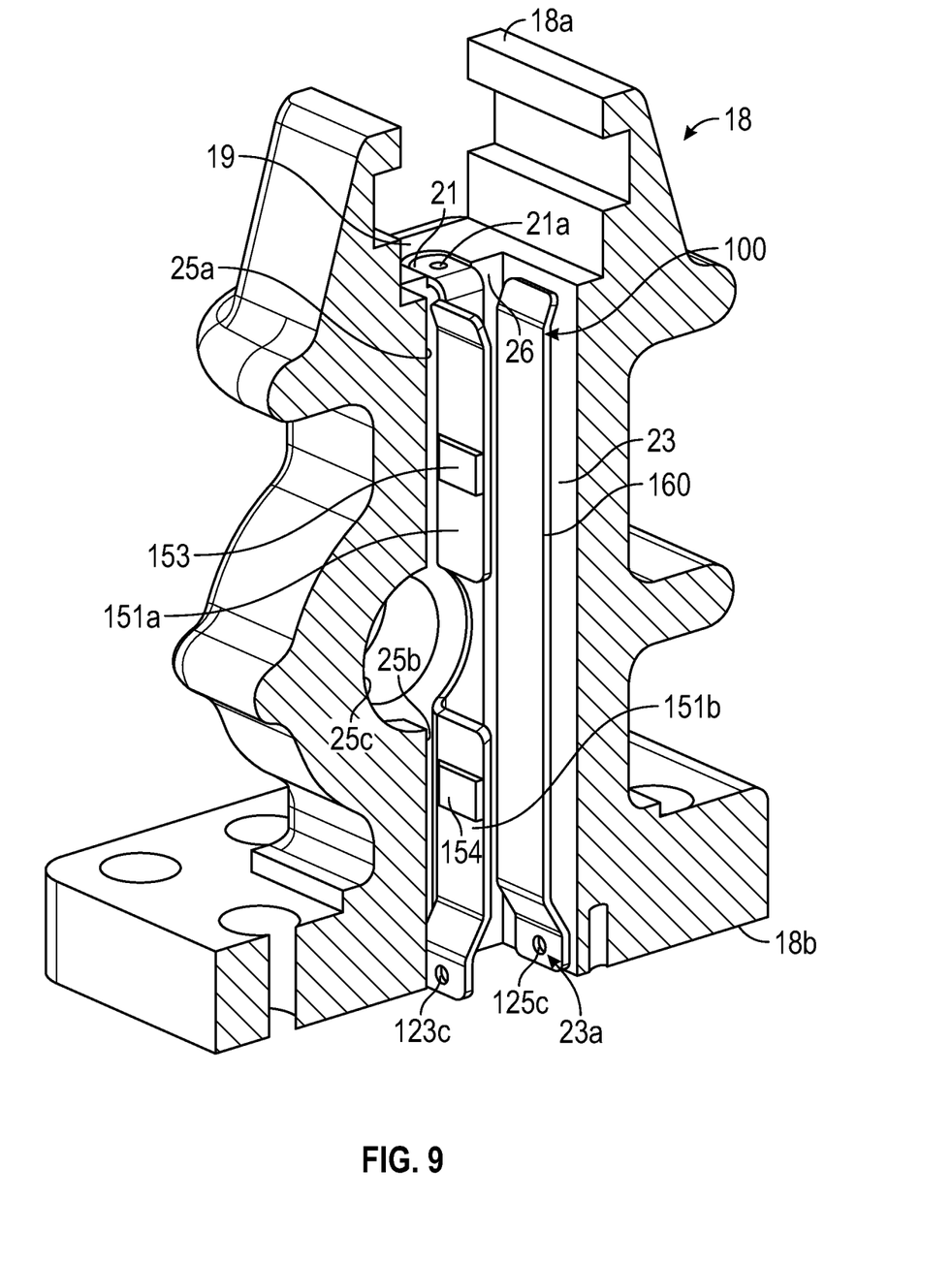
FIG. 9 shows a partial cross-sectional view in perspective of the positioning device and the top of the flowmeter of FIG. 5.
Figure 10:
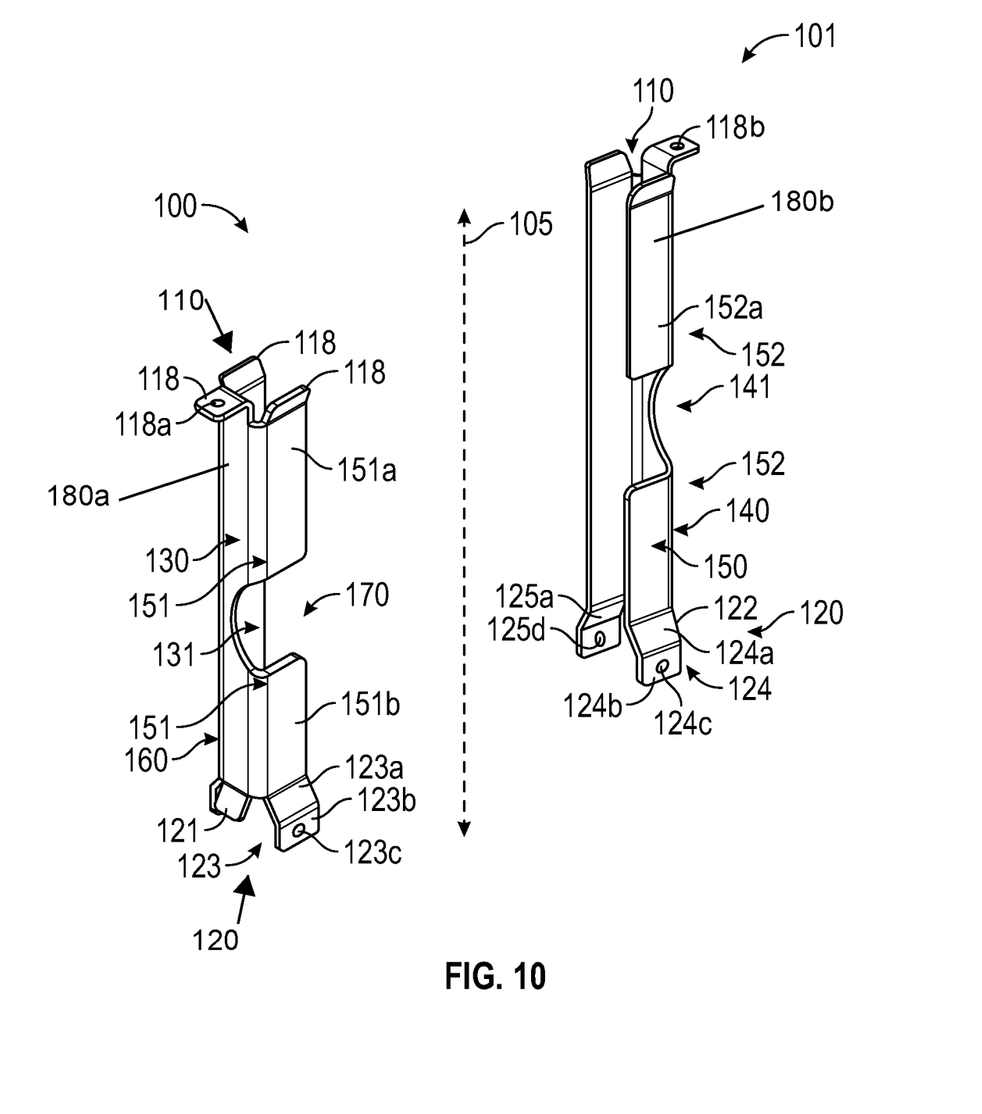
FIG. 10 shows an external perspective view of a two-piece embodiment of the positioning device of FIG. 1 in accordance with the principles described herein.
Figure 11:
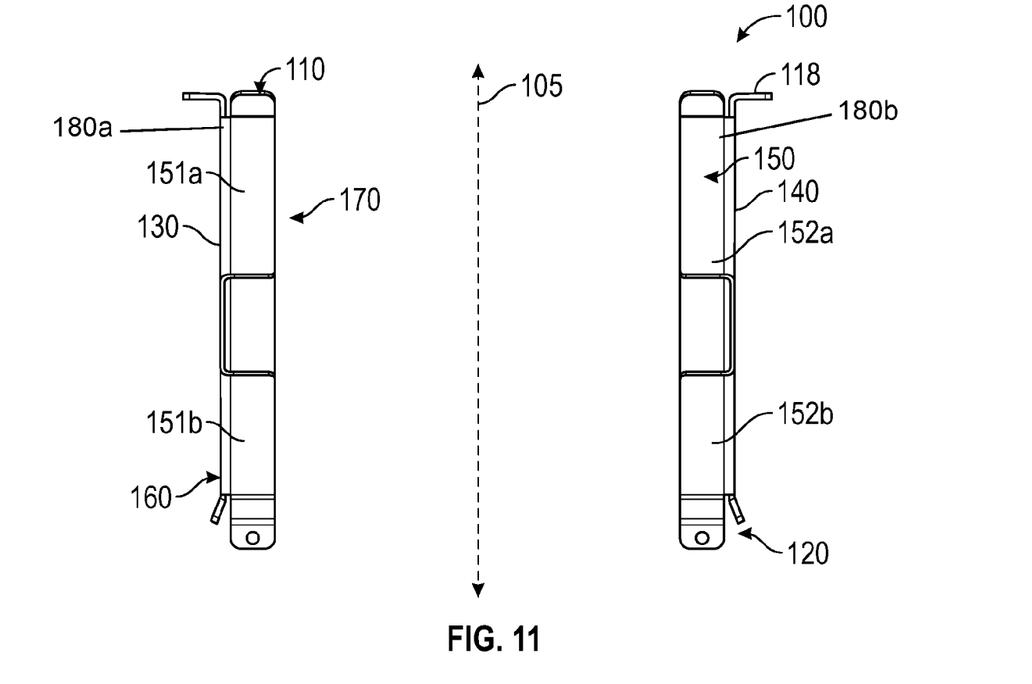
FIG. 11 is an external front view of the two-piece embodiment of the positioning device shown in FIG. 10.
Figure 12:
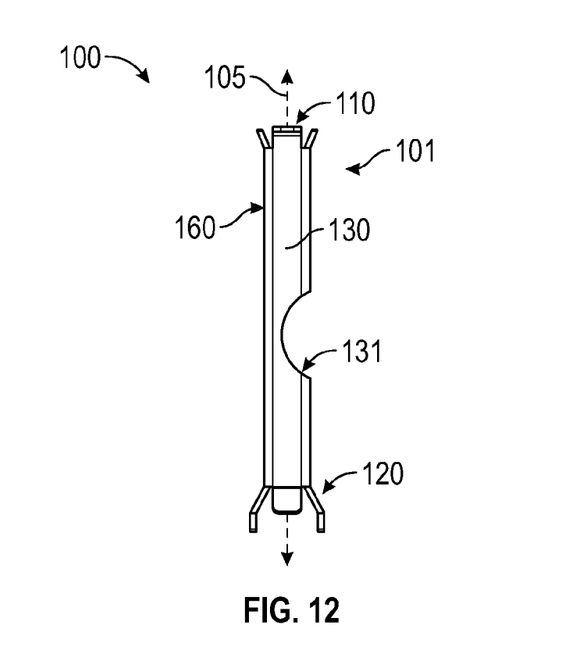
FIG. 12 is an external side view of the two-piece embodiment of the positioning device of FIG. 10.
Figure 13:
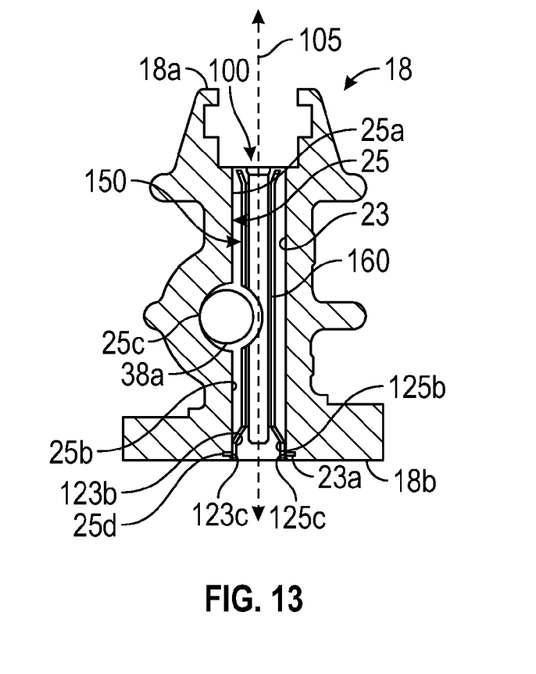
FIG. 13 shows a partial cross-sectional side view of the two-piece embodiment of the positioning device of FIG. 10 within the top of the flowmeter of FIG. 1.
Figure 14:
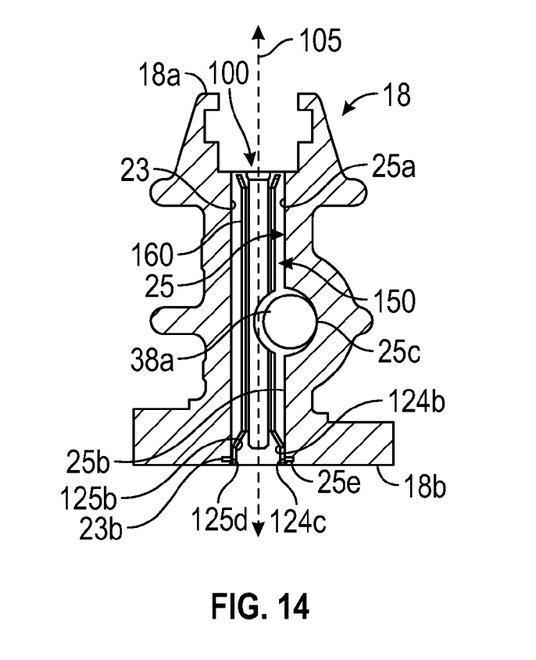
FIG. 14 shows a partial cross-sectional side view of the two-piece embodiment of the positioning device of FIG. 10 within the top of the flowmeter of FIG. 1.
Figure 15:
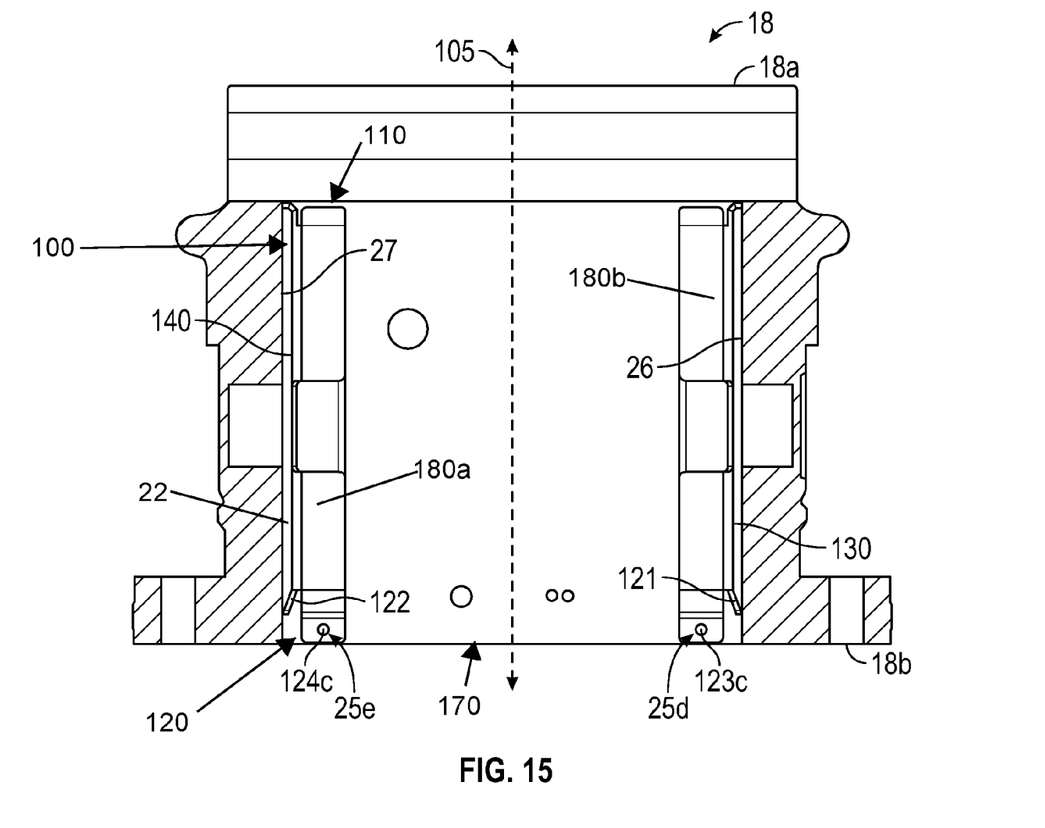
FIG. 15 shows a partial cross-sectional back view of the two-piece embodiment of the positioning device of FIG. 10 within the top of the flowmeter of FIG. 1.
Figure 16:
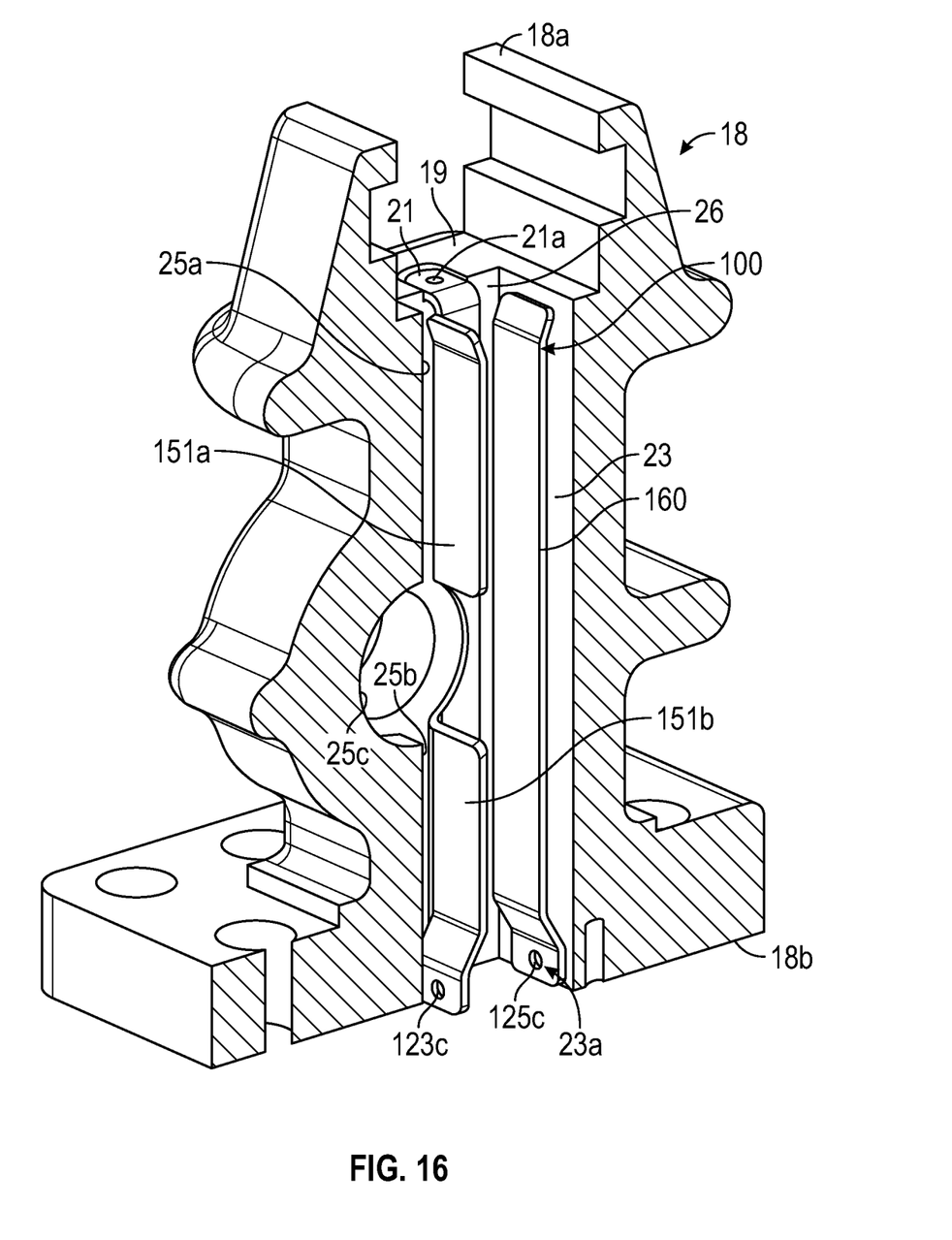
FIG. 16 shows a partial cross-sectional view in perspective of the two-piece embodiment of the positioning device of FIG. 10 within the top of the flowmeter of FIG. 1.

Referring now to FIGS. 5-9, an example of a top 18 of a flowmeter 12 with a plate carrier guide or insert 100 installed is shown. Insert 100 is disposed in upper chamber 22 of top 18, the top 18 having an upper end 18a and a lower end 18b. The back side 160 is disposed proximate a back side wall 23 of the upper chamber 22 (FIGS. 6 and 9). The front side 150 is disposed proximate a front side wall 25 of the upper chamber 22, the upper chamber front side wall 25 having an upper portion 25a and a lower portion 25b separated by a curved portion 25c (FIGS. 6 and 9); the curved portion 25c of front side wall 25 is configured to house the upper drive 38 and corresponding gears 38a and allow unobstructed rotation of the upper drive 38 and gears 38a therein (see FIG. 1). The upper portions 151a, 152a, respectively, of the first and second elongate portions 151, 152, respectively, and the upper cross panel 153 of insert 100 are disposed proximate upper portion 25a of upper chamber front side wall 25. Further, lower portions 151b, 152b, respectively, of the first and second elongate portions 151, 152, respectively, and the lower cross panel 154 of insert 100 are disposed proximate lower portion 25b of upper chamber front side wall 25.

The first side 130 is disposed proximate a first side wall 26 of the upper chamber 22, and the second side 140 is disposed proximate a second side wall 27 of upper chamber 22 (FIG. 8). The lip 118 of upper end 110 is adjacent an upper surface 19 of top 18 (FIG. 9); the lip may rest on top upper surface 19, in an indentation 21 in the top upper surface 19, or on a seal, such as, for example, a gasket or an elastomer member (not shown) disposed between either the lip 118 and the top upper surface 19 or between the lip 118 and the indention 21. The indentation 21 further includes two bores 21a, 21b disposed opposite each other, the first bore 21a is disposed proximate a first side 18c of top 18 and the second bore 21b is disposed proximate a second side 18d of top 18 (FIGS. 5 and 9). The bottom end 120 is disposed proximate lower end 18b and adjacent the back side wall 23, front side wall 25, first side wall 26, and second side wall 27 of the upper chamber 22 (FIGS. 6 and 8). In particular, the vertical portion 125b of the fifth protrusion 125 is adjacent the upper chamber back side wall 23 such that through bore 125c is aligned with corresponding threaded bore 23a in the back side wall 23, and through bore 125d is aligned with corresponding threaded bore 23b in the back side wall 23 (FIGS. 6 and 7). The vertical portion 123b of the third protrusion 123 is adjacent the lower portion 25b of front side wall 25 proximate the first side wall 26 such that through bore 123c is aligned with a corresponding threaded bore 25d in the lower portion 25b of front side wall 25 proximate first side wall 26 (FIGS. 6-8). The vertical portion 124b of the fourth protrusion 124 is adjacent the lower portion 25b of front side wall 25 proximate the second side wall 27 such that through bore 124c is aligned with a corresponding threaded bore 25e in the lower portion 25b of front side wall 25 proximate second side wall 27 (FIGS. 6-8). The first protrusion 121 is disposed proximate the first side wall 26, and the second protrusion 122 is disposed proximate the second side wall 27.

The insert 100 may be secured to the upper chamber 22 by any fastening means known in the art including, but not limited to threaded rods, bolts, screws, welding, and by being held in place when the sealing bar 40 and clamping bar 44 are installed. When installed, the sealing bar 40 is adjacent upper end 110 and may contact upper end 110. In the present embodiment, insert 100 is secured to top 18 with screws passing through bores 118a, 118b in top lip 118 and engaging threaded bores 21a, 21b in top 18. Insert 100 is further secured to top 18 with screws passing through bores 123c, 124c disposed on third and fourth vertical portions 123b, 124b, respectively, and engaging threaded bores 25d, 25e in front side wall 25 of top 18. Insert 100 is further secured to top 18 with screws passing through bores 125c, 125d disposed on fifth vertical portion 125b and engaging threaded bores 23a, 23b in back side wall 23 of top 18.

Referring again to FIG. 1, the operation of plate carrier 32 will be described for an embodiment having a plate carrier guide or insert 100 installed within the top 18 of flowmeter 12. As previously described, the lower drive 36 and the upper drive 38 operate to move the orifice plate carrier 32 vertically within flowmeter 12. The following discussion is directed to the movement of the orifice carrier plate 32 from the lower chamber 20 to the upper chamber 22; for simplicity, intermediary steps such as actuating slide valve plate 56 or removing clamping bar 44 and sealing bar 40 will not be described. One skilled in the art will appreciate that aside from directional differences, a discussion directed to the movement of the orifice carrier plate 32 from the upper chamber 22 to the lower chamber 20 would be substantially similar. Each drive 36, 38 includes a pair of gears 36a, 38a, respectively; gears 36a, 38a are configured to align with and engage corresponding grooves 32a on the orifice plate carrier 32. Grooves 32a are disposed in two columns on opposite ends of the orifice plate carrier 32. In the example of FIG. 1, grooves 32a include a plurality of linearly aligned gear teeth extending in the direction that carrier 32 travels. Each column of grooves 32a forms a rack, which may also be called a gear rack. The gears 36a, 38a may also be called spur gears. When the orifice plate carrier 32 is located in the lower chamber 20, lower drive gears 36a engage the orifice plate carrier grooves 32a such that actuating lower drive 36 causes the orifice plate carrier 32 to move vertically upward from the lower chamber into upper chamber 22. When the orifice plate carrier 32 moves into the upper chamber 22, the upper drive gears 38a engage the orifice plate carrier grooves 32a through cutouts 131, 141 (FIG. 2) in the first side 130 extending to the first elongate portion 151 of the front side 150 and the second side 140 extending to the second elongate portion 152 of the front side 150 of insert 100, and when the orifice plate carrier 32 reaches a certain height in the upper chamber 22, the lower drive gears 36a disengage the orifice plate carrier grooves 32a. Continuing to reference FIG. 1, insert 100 centers and guides the orifice plate carrier 32 while it travels through upper chamber 22. The actuation of the upper drive 38 further raises the orifice plate carrier 32 to extend beyond top 18 of orifice meter 12 for removal. In alternative embodiments, the lower drive 36 and gear shaft 54 of flowmeter 12 may comprise components other than nuts having varying geometry that will actuate the slide valve plate 56.

As the orifice plate 33 provides measurement of the stream flowing within pipeline 34 and through the flowmeter 12, the orifice plate 33 should be centered for accuracy. However, during the fabrication of the flowmeter 12, variations in wall thickness and the contours of the internal chambers can make it difficult to position an orifice plate carrier 32 for insertion and alignment. For the orifice plate carrier 32 to be inserted or removed from the flowmeter 12, the grooves 32a of the orifice plate carrier 32 need to remain in contact and engaged with the gears 38a of the upper drive 38 as the orifice plate carrier 32 travels through the top 18. The insert 100 allows for consistent and repeatable alignment in guiding the orifice plate carrier 32 in and out of flowmeter 12 regardless of variations in the wall thickness and contours of the internal chambers of the flowmeter.

The plate carrier guide or insert 100 may be a one piece construction, as illustrated in FIGS. 2-9, or may be a two-piece construction, as illustrated in FIGS. 10-16. Like parts are designated with like reference numerals. The embodiment of insert 100 introduced in FIG. 10 includes first and second pieces or guide channels 180a, 180b, which are spaced-apart and located on opposite sides of axis 105. The second guide channel 180b is separated from and is not attached to the first guide channel 180a. The first side 130 and associated features are located in guide channel 180a. Second side 140 and associated features are located in guide channel 180b. The guide channels 180a, 180b may be installed in or removed from top 18 of flow meter 12 separately, one-at-a-time. As shown best in FIG. 10 and FIG. 15, guide channels 180a, 180b form a cavity or interior through-passage 170 from the upper end 110 to the lower end 120. Through-passage 172 extends within and between guide channels 180a, 180b. When insert 100 is installed within top 18 (FIG. 15), through-passage 172 extends within the upper chamber 22 and is configured to receive orifice plate carrier 32, allowing it to enter and to pass-through insert 100.

In other embodiments, the plate carrier guide 100 may be formed from any number of pieces that maintains the structural integrity of the plate carrier guide 100. A plate carrier 32 is typically aligned in the top chamber 22 through the use of pads that are cast into the top chamber. The cast features can be difficult to control during casting and can restrict the geometry of the opening in the top chamber. With the use of the plate carrier guide 100 to guide the plate carrier 32, protrusions or pads cast into the upper chamber as positioning devices are no longer needed. Thus, the plate carrier guide 100 may be used in alternative casting designs that may be easier to manufacture. For example, one or more of the inner walls 23, 25, 26, 27 of upper chamber 22 may be smooth or flat, being free of protrusions. Some of these embodiments may include the walls may be described as being generally smooth or generally flat. Some embodiments may include an oval design for the shape of the upper chamber 22 (for example, having an oval-shaped cross-section that extends away from lower chamber 20 or axis 35 to form the walls 23, 25, 26, 27) and may be easier to manufacture.

While exemplary embodiments have been shown and described, modifications thereof can be made by one skilled in the art without departing from the scope or teachings herein. The embodiments described herein are exemplary only and are not limiting. Many variations and modifications of the systems, apparatus, and processes described herein are possible and are within the scope of the disclosure. For example, the relative dimensions of various parts, the materials from which the various parts are made, and other parameters can be varied. Accordingly, the scope of protection is not limited to the embodiments described herein, but is only limited by the claims that follow, the scope of which shall include all equivalents of the subject matter of the claims. Unless expressly stated otherwise, the steps in a method claim may be performed in any order. If utilized, the recitation of identifiers such as (a), (b), (c) or (1), (2), (3) before steps in a method claim are not intended to and do not specify a particular order to the steps, but rather are used to simplify subsequent reference to such steps.

What is claimed is:

1. An apparatus for positioning an orifice plate in an orifice fitting, the apparatus comprising:
    an insert having a through-passage extending from a first end to a second end, the second end having extensions configured to secure the apparatus to an internal portion of the orifice fitting;
    wherein the first end has a first opening to allow access to the through-passage; and
    wherein the second end has a second opening to allow access to the through-passage;
    wherein the insert has a first side including a first cutout and a second side including a second cutout;
    wherein the through-passage is configured to allow an orifice plate carrier, including the orifice plate installed thereon, to pass therethrough; and
    wherein the first and second cutouts are configured to allow a gear to pass therethrough, the gear configured to engage the orifice plate carrier.

2. The apparatus of claim 1, wherein the first end further includes a lip configured to engage a top surface of the orifice fitting.

3. The apparatus of claim 1, wherein the first end further includes a plurality of protrusions configured to engage a top surface of the orifice fitting.

4. The apparatus of claim 1, further comprising a seal disposed between the first end and a top surface of the orifice fitting.

5. The apparatus of claim 1, wherein the extensions are welded to the internal portion of the orifice fitting.

6. The apparatus of claim 1, wherein the extensions comprise through holes in alignment with bores in the internal portion of the orifice fitting, the through holes and bores are configured to accept a fastener therein.

7. The apparatus of claim 1, wherein the insert is retained in the orifice fitting with a sealing bar disposed adjacent the first end, wherein the sealing bar is configured to attach to the orifice fitting with clamping bar screws.

8. The apparatus of claim 1, wherein the insert comprises a first piece and a second piece separate from the first piece, the first side disposed on the first piece and the second side disposed on the second piece.

9. An orifice fitting having a system for positioning an orifice plate carrier in the orifice fitting, the fitting comprising:
    a body having a lower chamber and a top having an upper chamber;

an orifice plate disposed in the orifice plate carrier, the carrier having a first row of grooves disposed on a first end of the orifice plate carrier and second row of grooves disposed on a second end of the orifice plate carrier;

a gear disposed in the upper chamber configured to engage the orifice plate carrier; and an insert disposed in the upper chamber, the insert having a through-passage, a first end with a first opening, a second end with a second opening and a plurality of protrusions, a first side, and a second side, where the through-passage extends from the first opening to the second opening;

wherein the first side includes a first cutout and the second side includes a second cutout;

wherein the through-passage is configured to allow the orifice plate carrier to pass therethrough; and wherein the first and second cutouts are configured to allow the gear to pass therethrough.

10. The fitting of claim 9, wherein the first end further includes a lip configured to engage a top surface of the orifice fitting.

11. The fitting of claim 9, wherein the first end further includes a plurality of protrusions configured to engage a top surface of the orifice fitting.

12. The fitting of claim 9, wherein the insert is rectangular.

13. The fitting of claim 9, wherein the upper chamber includes an oval-shaped cross-section.

14. The fitting of claim 9, wherein the first end is configured to engage a seal disposed between the first end and a top surface of the orifice fitting.

15. The fitting of claim 9, wherein the protrusions are welded to an internal portion of the upper chamber.

16. The fitting of claim 9, wherein the protrusions comprise through holes in alignment with bores in an internal portion of the upper chamber, the through holes and bores are configured to accept a fastener therein.

17. The fitting of claim 9, further comprising a sealing bar disposed at an upper end of the top and configured to attach to the top with clamping bar screws and retain the insert in the upper chamber.

18. The fitting of claim 9, wherein the insert comprises a first piece and a second piece, the first side disposed on the first piece and the second side disposed on the second piece.

19. The fitting of claim 9 wherein the body further comprises:

a flow passage that extends through the lower chamber; and an aperture connecting the upper chamber to lower chamber, the aperture configured to isolate the upper chamber and the insert from the flow passage.

20. A method of positioning an orifice plate carrier in an orifice fitting, the method comprising:

engaging grooves on opposite ends of the orifice plate carrier with a first drive gear and a second drive gear, where the orifice plate carrier is disposed in a through-passage of an insert, the first drive gear passes through a first cutout in the insert, and the second drive gear passes through a second cutout in the insert;

actuating the first and second drive gears via an upper drive; and passing the orifice plate carrier through the insert.

* * * * *